UNITED STATES PATENT OFFICE.

HERBERT C. GORE, OF WASHINGTON, DISTRICT OF COLUMBIA.

PROCESS OF TREATING JAPANESE PERSIMMONS, &c.

1,015,950.  Specification of Letters Patent.  Patented Jan. 30, 1912.

No Drawing.   Application filed September 6, 1911.   Serial No. 648,006.

(DEDICATED TO THE PUBLIC.)

*To all whom it may concern:*

Be it known that I, HERBERT C. GORE, an employee of the Department of Agriculture of the United States of America, residing in the city of Washington, District of Columbia, have invented a new and useful Process for Treating Japanese Persimmons and other Astringent Fruits so as to Make Them Non-Astringent.

This application is made under the act of March 3, 1883, Chapter 143 (22 Stat., 625), and the invention herein described and claimed may be used by the Government of the United States or any of its officers or employees in the prosecution of work for the Government or by any person in the United States without the payment of any royalty thereon.

My invention relates to a process for treating Japanese persimmons and other astringent fruits so as to render them non-astringent.

It is well known that the best varieties of Japanese persimmons are so astringent that they cannot be eaten until the fruit becomes very soft. When the persimmons are soft, it is exceedingly difficult to get them to the consumer as they easily change from this stage to a mass of pulp by jarring. As a result of no satisfactory method being devised for preserving the fruit in a firm, palatable condition, the successful introduction of the fruit as a commercial product has been delayed. By my process of treating the fuit, the introduction of the fruit on a commercial scale is made possible. The fruit can be easily grown, is delicious in flavor and high in nutritive value.

The only method heretofore employed in treating Japanese persimmons so that they become non-astringent while remaining firm is by placing the fruit in empty saki casks, then closing the casks tightly and allowing the fruit to remain therein, for several days, unopened. At the end of this time if the treatment has been successful the fruit will be found to be non-astringent and firm so that the same may be eaten out of hand like an apple. Such treatment is called "processing".

By experiments, I have ascertained that keeping the fruit in saki casks, or in other air tight containers, caused the oxygen in the air surrounding the fruit to be gradually used up by the fruit in respiration, and the lack of oxygen seems to cause the fruit to become non-astringent, while at the same time the softening processes are retarded. A dual effect is thus obtained, *i. e.*, the disappearance of astringency in the fruit and the retention of its firmness.

My invention consists in placing the fruit in an air tight container and immediately removing the oxygen surrounding the fruit therein, without depending on the slow exhaustion of oxygen by the physiological processes of the fruit. In order to displace the air in the container I employ carbon dioxid. This gas is the most convenient to use for accomplishing such purpose. However, I do not confine myself to the exclusive use of carbon dioxid in practicing my invention, but other gases, such as hydrogen or nitrogen may be successfully employed.

By the use of my method in treating Japanese persimmons the processing occurs much more rapidly and satisfactorily than by the method of permitting the respiration of the fruit to use up the oxygen. This latter method of processing Japanese persimmons is not successful when practiced on some of the varieties of such fruits. There are certain kinds of Japanese persimmons which do not yield to this treatment. When the persimmons are processed in carbon dioxid I find that the fruit becomes not only non-astringent much earlier than when processed by the old method herein mentioned, but the several varieties of the fruit which it has not been found possible to treat successfully by such method, yield readily when the air in the casks or other receptacle holding the fruit is displaced artificially by carbon dioxid.

The fruit when processed according to my method, is not only non-astringent, but retains its firmness. It is preserved in its natural state, can be readily eaten and may be handled in the containers on a commercial scale.

My process for treating Japanese persimmons may be employed in a like manner to other fruits which contain tannin when immature, such as the date, the banana, the sapodilla and the carob. Therefore I do not confine its usefulness exclusively to treating Japanese persimmons, but I extend its employment to the treatment of any fruits which contain tannin when immature.

Having thus described my invention I claim:

1. In a process for removing the astringency of fruits, consisting in placing the fruits in an air-tight container, then displacing the air in said container by the use of carbon dioxid, substantially as specified.

2. In a process for removing the astringency of fruits, consisting in placing the fruits in an air-tight container, keeping the fruits therein and subjecting them to the action of inert gases, substantially as specified.

3. In a process for removing the astringency of fruits, consisting in placing the fruits in an air-tight container, then displacing the air in said container by the use of carbon dioxid, thereby causing the fruits to remain firm, substantially as specified.

In testimony whereof, I affix my signature in the presence of two subscribed witnesses.

HERBERT C. GORE.

Witnesses:
CHARLES W. BOYLE,
EDWIN S. FRENCH.